United States Patent
Kurumado et al.

(10) Patent No.: US 8,130,115 B2
(45) Date of Patent: Mar. 6, 2012

(54) SIGNAL PROCESSING CIRCUIT FOR ROTATION DETECTING DEVICE

(75) Inventors: Norihiro Kurumado, Nagoya (JP); Hiroshi Okada, Aichi-ken (JP); Nobukazu Oba, Okazaki (JP); Hirofumi Uenoyama, Kita Nagoya (JP)

(73) Assignee: Denso Corporation, Kariya (JP)

( * ) Notice: Subject to any disclaimer, the term of this patent is extended or adjusted under 35 U.S.C. 154(b) by 379 days.

(21) Appl. No.: 12/507,916

(22) Filed: Jul. 23, 2009

(65) Prior Publication Data
US 2010/0019917 A1   Jan. 28, 2010

(30) Foreign Application Priority Data
Jul. 23, 2008   (JP) ................................. 2008-189594

(51) Int. Cl.
*G08B 21/00* (2006.01)
(52) U.S. Cl. ...................... 340/686.3; 340/549; 340/671; 340/672; 340/679; 340/680
(58) Field of Classification Search ............... 340/686.3, 340/539.1, 549, 573.1, 671, 672, 679, 680
See application file for complete search history.

(56) References Cited

U.S. PATENT DOCUMENTS

| | | | | |
|---|---|---|---|---|
| 4,931,815 A * | 6/1990 | Sato et al. | ...................... | 347/116 |
| 5,099,260 A * | 3/1992 | Sato et al. | ...................... | 347/116 |
| 6,345,193 B2 * | 2/2002 | Dutto et al. | ................... | 600/415 |
| 6,634,264 B1 * | 10/2003 | Takeuchi et al. | ................ | 82/118 |
| 7,409,737 B2 * | 8/2008 | Cho et al. | ........................... | 8/159 |
| 2007/0139036 A1 | 6/2007 | Kondo | | |

FOREIGN PATENT DOCUMENTS

| | | |
|---|---|---|
| JP | 10-332725 | 12/1998 |
| JP | 2004-028600 | 1/2004 |
| JP | 2007-170922 | 7/2007 |

* cited by examiner

*Primary Examiner* — Daryl Pope
(74) *Attorney, Agent, or Firm* — Nixon & Vanderhye PC (57) ABSTRACT

In the normal rotation direction, a change in the main sensing signal caused by a front edge is defined as a signal change caused by an effective edge, and a change in the main sensing signal caused by a back edge is defined as a signal change caused by an ineffective edge. In the reverse direction, a change in the main sensing signal caused by the back edge is defined as a signal change caused by an effective edge, and a change caused by a front edge is defined as a signal change caused by an ineffective edge. Regardless of the rotation direction, a detection signal generating circuit generates a detection signal including falling-edge changes and rising edge changes caused by the effective edge and ineffective edge respectively. When the direction is changed, the signal change on the detection signal is prohibited. As a result, gear tooth detection discrepancies are prevented.

15 Claims, 6 Drawing Sheets

SIGNAL PROCESSING CIRCUIT FOR ROTATION DETECTING DEVICE

CROSS-REFERENCE TO RELATED APPLICATION

This application is based an and claims the benefit of priority from earlier Japanese Patent Application No. 2008-189594 filed Jul. 23, 2008, the description of which is incorporated herein by reference.

BACKGROUND OF THE INVENTION

1. Field of the Invention

The present invention relates to a signal processing circuit for a rotation detecting device. In particular, the present invention relates to a signal processing circuit for a rotation detecting device using non-contact type magnetic sensors. More particularly, the invention includes a signal processing circuit that, when a plurality of magnetic sensors, disposed opposed to a rotating body on which gear teeth are formed, outputs rectangular first and second sensing signals both having a rectangular waveform but differing in phase, and outputs a detection signal for detecting a rotational position of the rotating body based on the first and second sensing signals.

2. Description of the Related Art

Figure 1:
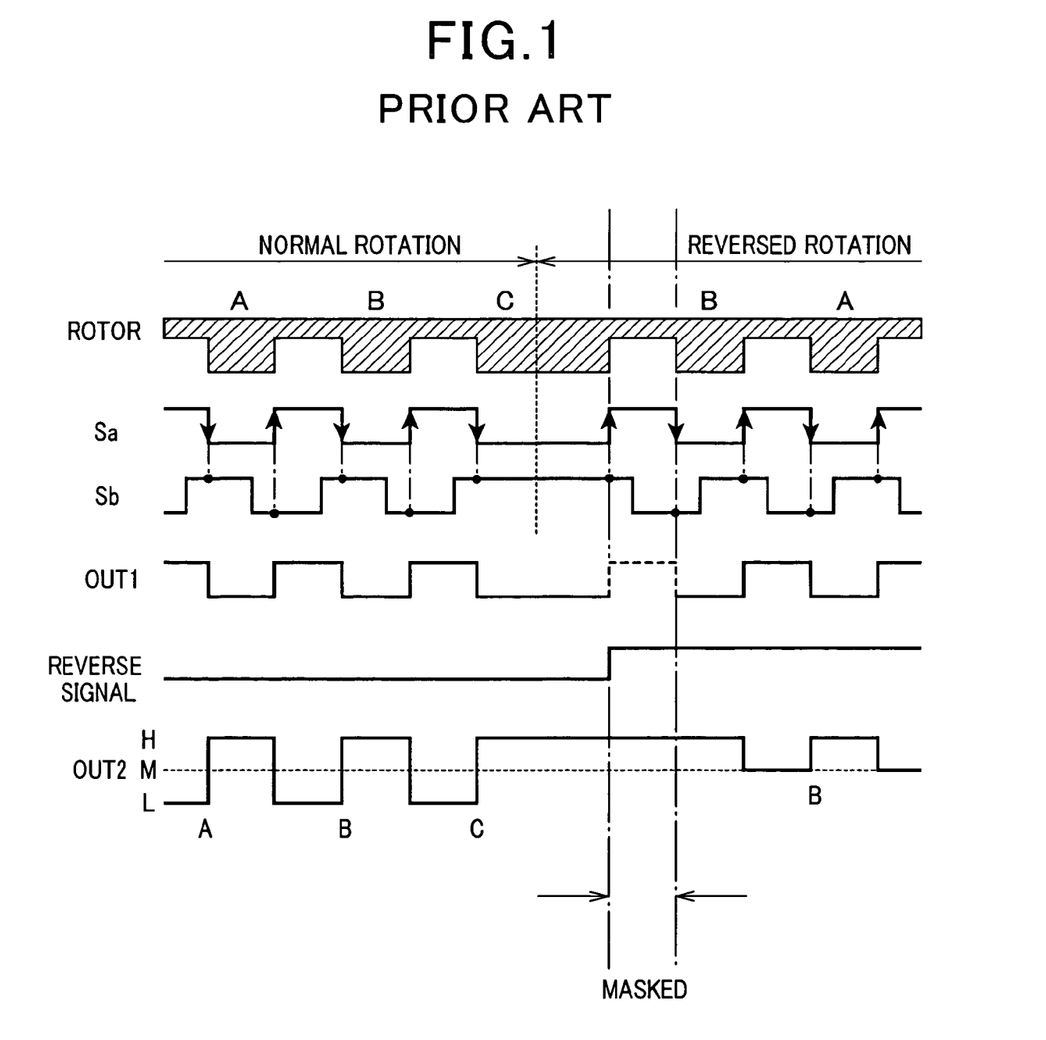
FIG. 1 is an explanatory diagram of issues involving a conventional circuit.

A technique described in, for example, Japanese Patent Laid-open Publication No. 2007-170922 is known as a conventional signal processing circuit for a rotation detecting device. The rotation detecting device described in this Publication No. 2007-170922 includes two magnetic sensors that output rotation detection signals Sa and Sb having differing phases when a rotor on which gear teeth are farmed rotates. The signal processing circuit judges that a rotation direction of the rotor has been reversed based on a change in the relative phase of the rotation detection signals Sa and Sb, such as that as shown in FIG. 1, and generates a reverse signal. The signal processing circuit also detects the edges of the rotation detection signal Sa.

The signal processing circuit then generates a level-switching inactivation signal that prohibits signal level switching performed synchronously with both the first rising edge and the first failing edge of the signal Sa after reversed rotation of the rotor is detected. Based on the level-switching inactivation signal, the signal processing circuit generates a first output signal OUT1 by masking the signal Sa for the duration of a single pulse immediately after the reversed rotation of the rotor is detected, and outputs the generated first output signal OUT1. Moreover, based on the first output signal OUT1 and the reverse signal, the signal processing circuit generates a second output signal OUT2 and outputs the generated second output signal OUT2. The second output signal OUT2 changes between a high level and a low level, when the rotor is rotating in a normal direction, and changes between a high level and a middle level, when the rotor is rotating in the reverse direction.

However, when the signal Sa is simply masked for the duration of a single pulse immediately after the reversed rotation of the rotor is determined as in the above-described conventional technology, an accurate rotational position of the rotor is difficult to detect from the second output signal that is ultimately generated and outputted. The reasons for this difficulty will be described with reference to FIG. 1.

As shown in FIG. 1, when the rotor is rotating in the normal direction, the rising edges of the second output signal OUT2 correspond to the positions of the front edges in the rotation direction of a tooth A, a tooth B, and a tooth C on the rotor. Therefore, the positions of the rotational front edge of each tooth can be detected based on the rising edge of the second output signal OUT2.

However, when a tooth on the rotor is detected by the rising edge of the second output signal OUT2 in the same manner and the rotation direction of the rotor changes from normal to reverse, a discrepancy occurs in the detection result. As shown in FIG. 1, the detection result is tooth B when, in actuality, the tooth is tooth A.

To prevent such discrepancies in the detection results, detecting the position of each tooth based on the falling edge of the second output signal OUT2 can be considered when the rotor is rotating in the reverse direction. However, in this instance, the edge of the second output signal OUT2 used for detecting the teeth on the rotor is required to be switched between the rising edge and the falling edge based on the rotation direction of the rotor. Therefore, the signal processing operation becomes complex. Moreover, even when the edge of the second output signal OUT2 used for detecting the teeth on the rotor is switched, as shown in FIG. 1, the rotation-direction front edge of the rotor is detected when the rotor is rotating in the normal direction, and the rotation-direction back edge of the rotor is detected when the rotor is rotating in the reverse direction. In this way, different positions are detected depending on whether the rotor is rotating in the normal direction or the reverse direction. Therefore, it is difficult to accurately detect the rotational position of the rotor.

SUMMARY OF THE INVENTION

The present invention has been achieved in light of the above-described issues. An object of the present invention is to provide a signal processing circuit for rotation detecting devices, which is able to more accurately detect a rotational position of a rotating body (rotor) on which gear teeth are formed.

To achieve the above described object, a first aspect of the invention provides a signal processing circuit for a rotation detecting device, wherein the signal processing circuit outputs a detection signal indicating both a rotation position and a rotation direction of a rotary member provided with gear teeth including plural convex portions and plural concave portions, a plurality of magnetic sensors being opposed to the rotary member and formed to output first and second sensing signals which are rectangular-waveformed and differ in phase from each other in response to movement of the rotary member, the rotary member being allowed to selectively rotate in a normal direction thereof and a reverser direction thereof, each of the convex portions having a front edge and a back edge which come first and precede later in either the normal direction or the reverse direction, the signal processing circuit comprises: a direction detecting means for detecting a transition of the rotation direction in which the rotation direction of the rotary member changes from the normal direction to the reverse direction or from the reverse direction to the normal direction based on a phase relationship between the first and second sensing signals, a detection signal generating means, which operates under conditions that, when the rotation direction of the rotary member is one of the normal and reverse directions, a change in the first sensing signal caused by the front edge of the convex portion is defined as a signal change caused by an effective edge in the one direction and a change in the first sensing signal caused by the back edge of the convex portion is defined as a signal change caused by an ineffective edge in the one direction, and when rotation direction of the rotary member is the other of the normal and reverse directions, a change in the first sensing signal caused by the hack edge of the convex portion is defined as a signal change caused by an effective edge in the other rotation direction and a change in the first sensing signal caused by the front edge of the convex portion is defined as a signal change caused by an ineffective edge in the other rotation direction, for generating the detection signal regardless of whether the rotation direction of the rotary member is the normal or the reverse direction, the detection signal including rising-edge change and falling-edge change thereon, the detection signal being provided such that one of either rising-edge changes or falling-edge changes successively occurs corresponding to the signal change caused by the effective edge occurring in the first sensing signal and the other of either the rising-edge changes or the falling-edge changes successively occurs corresponding to the signal change caused by the ineffective edge occurring in the first sensing signal, the detection signal being used to count the number of effective edges to obtain the rotational position and the rotational direction of the rotary member; and a prohibiting means for prohibiting the same edge change that is one of either the rising-edge change or the falling-edge change from successive occurring in the detection signal in response to a signal change in the first sensing signal caused by a first effective edge when the direction detecting means detects the rotation direction transition of the rotary member.

As described above, in the signal processing circuit for a rotation detecting device according to the first aspect of the invention, a concept of effective edge and ineffective edge is implemented. When the rotation direction of the rotary member is one of the normal and reverse directions, a change in the first sensing signal caused by the front edge of the convex portion is defined as a signal change caused by an effective edge in the one direction and a change in the first sensing signal caused by the back edge of the convex portion is defined as a signal change caused by an ineffective edge in the one direction, and when rotation direction of the rotary member is the other of the normal and reverse directions, a change in the first sensing signal caused by the back edge of the convex portion is defined as a signal change caused by an effective edge in the other rotation direction and a change in the first sensing signal caused by the front edge of the convex portion is defined as a signal change caused by an ineffective edge in the other rotation direction. The detection signal generating circuit generates the detection signal in which, regardless of whether the rotor is rotating in the normal direction or the reverse direction, the same change that is one of either the rising-edge change or the falling-edge change occurs based on the signal-change caused by the effective edge in the main sensing signal, and the same change that is the other of either the rising-edge change or the falling-edge change occurs based on the signal-change caused by the ineffective edge.

When the rotary member changes the rotation direction, the same change that is one of either the rising-edge change or the falling-edge change is prohibited from occurring in the detection signal in response to the signal-change in the first sensing signal caused by the first effective edge. As a result, gear tooth detection discrepancies can be prevented.

Therefore, the same edge position of the gear tooth on the rotary member can be detected regardless of the rotation direction of the rotary member, based on the same change that is one of either the rising-edge change or the falling-edge change occurring in the detection signal. As a result, the rotational position of the rotary member can be detected with high accuracy.

According to a second aspect of the invention, the detection signal preferably changes among three levels, i.e. high level, middle level and low level. The detection signal preferably changes by differing degrees depending on whether the rotary member is rotating in the normal direction or the reverse direction. As a result, in addition to the rotational position, the rotation direction of the rotary member can also be detected from the detection signal.

According to a third aspect of the invention, even when the signal-change caused by the first effective edge occurs in the first sensing signal when the transition of the rotation direction of the rotary member occurs, the prohibiting means preferably prohibits the same change that is one of either the rising-edge change or the falling-edge change from occurring in the detection signal by keeping the detection signal fixed at the middle level.

As a result, the prohibiting means is simply required to fix the detection signal at the middle level when the signal-change caused by the first effective edge occurs in the first sensing signal during the transition of the rotation direction. Therefore, a circuit for configuring the prohibiting means can be simplified.

The direction detecting means identifies the rotation direction of the rotary member from the level of the second sensing signal when the first sensing signal changes, and detects the transition of the rotation direction if the identified rotation direction changes. When the change in the first sensing signal successively occurs and detects the transition of the rotation direction from the level of the second sensing signal, if the change in the first sensing signal is caused by the effective edge, the detection signal is merely required to be switched to the middle level and held in response to the change in the first sensing signal caused by the effective edge. Also, if the change in the first sensing signal occurred subsequently is caused by the ineffective edge, the detection signal is switched to the middle level and held in response to the change in the first sensing signal caused by the ineffective edge. The detection signal is merely required to remain unchanged at the middle level even when a signal-change caused by a first effective edge subsequently occurs in the first sensing signal. As a result, the detection signal can remain unchanged at the middle level even when the signal-change caused by the first effective edge occurs in the first sensing signal when the transition of the rotation direction of the rotary member occurs.

Even when the signal-change, such as that above, caused by the first effective edge occurs when the transition of the rotation direction of the rotary member occurs, the detection signal fixed at the middle level can be released in response to the signal-change caused by the ineffective edge occurring in the first sensing signal, when the rotary member continues rotating in the same direction. When the rotary member continues rotating in the same direction, the signal-change caused by the effective edge and the signal-change caused by the ineffective edge occur in the first sensing signal in an alternating manner. Therefore, as a result of the detection signal fixed to the middle level being released by the signal-change caused by the ineffective edge, and the same change that is the other of either the rising-edge change or the falling-edge change occurring in the detection signal (the detection signal does not change when the detection signal is to be changed to the middle level by the ineffective edge, because the detection signal is already at the middle level), the same change that is one of either the rising-edge change or the falling-edge change can occur based on the signal-change caused by the following and subsequent effective edges.

After the transition of the rotation direction of the rotary member is detected and the detection signal is switched to the middle level, when the signal-change caused by the effective edge does not occur and the signal-change caused by the ineffective edge occurs three consecutive times in the first sensing signal, the prohibiting means preferably releases the detection signal fixed to the middle level and allows the same change that is one of either the rising-edge change or the falling-edge change to occur in the detection signal based on a signal-change caused by a subsequent effective edge. The signal-change caused by the ineffective edge occurs three consecutive times in the first sensing signal without the signal-change caused by the effective edge occurring after the transition of the rotation direction of the rotary member, when the rotary member repeatedly reverses the rotation direction near a range of a single gear tooth. In an instance such as this, when the detection signal is prohibited from changing when the signal-change caused by the effective edge occurs, detection discrepancies occur.

DETAILED DESCRIPTION OF THE PREFERRED EMBODIMENT

Figure 2:
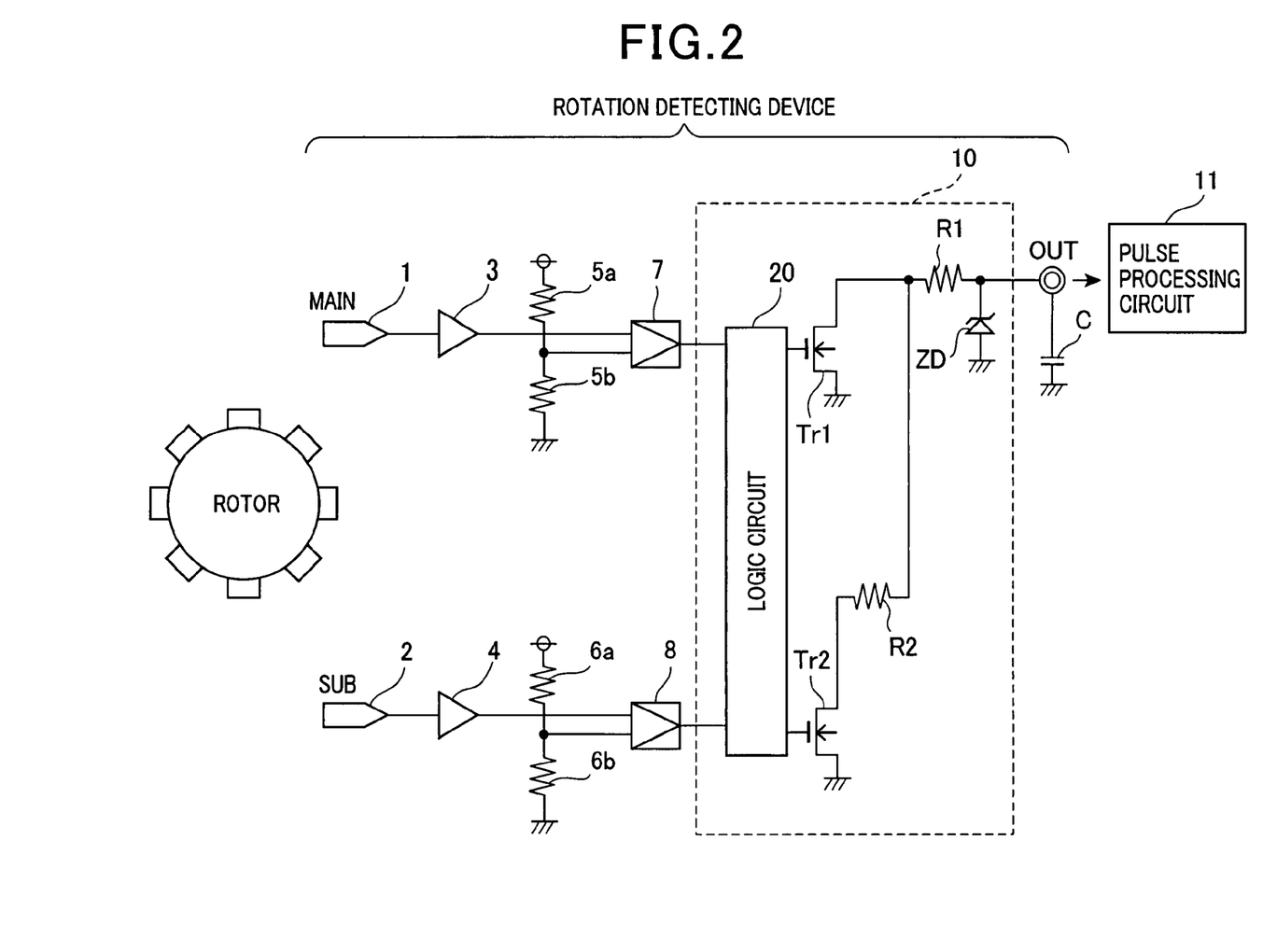
FIG. 2 is a block diagram showing an overall configuration of a rotation detecting device according to an embodiment.

A preferred embodiment of the present invention will be described with reference to the attached FIGS. 2 to 8. FIG. 2 is a block diagram showing an overall configuration of a rotation detecting device according to the embodiment.

In FIG. 2, a main magnetic sensor 1 and a sub magnetic sensor 2 include magneto-electric devices, such as a magneto-resistive element and a Hall element. The main magnetic sensor 1 and the sub magnetic sensor 2 are disposed a predetermined distance apart on an outer peripheral surface of a rotor and disposed as being opposed to the rotating body (referred to a rotary member or a rotor). The rotor is made of a magnetic material. Gear teeth are formed on the outer periphery of the rotor, Therefore, when the rotor rotates, the main magnetic sensor 1 and the sub magnetic sensor 2 output periodic signals (such as at ¼-cycles) having differing phases.

In other words, when the rotor rotates, convex portions and concave portions of the gear teeth formed on the outer periphery of the rotor alternately pass near the main magnetic sensor 1 and the sub magnetic sensor 2. Therefore, the magnetic field acting on each magnetoelectric device in the main magnetic sensor 1 and the sub magnetic sensor 2 also periodically changes. The magnetoelectric devices in the main magnetic sensor 1 and the sub magnetic sensor 2 convert the changes in the magnetic field to electrical signals. Amplifiers 3 and 4 amplify the electrical signals. The amplified electrical signals are then inputted into comparators 7 and 8. The comparators 7 and 6 compare the inputted amplified electrical signals with reference voltages generated by respective resistors 5a and 5b and resistors 6a and 6b, thereby digitizing the electrical signals. Thus, the amplifier 3 and 4, the resistors 5a, 5b and 6a, 6b and the comparators 7 and 8 function as a signal conditioning circuit.

Therefore, as a result of the above-described configuration, rectangular pulse signals (referred to, hereinafter, as sensing signals) that periodically change with the passage of the convex portions and the concave portions of the gear teeth on the rotor can be respectively obtained from the main magnetic sensor 1 and the sub magnetic sensor 2. The sensing signals are inputted into a signal processing circuit 10.

The signal processing circuit 10 generates a detection signal for detecting a rotational position and a rotation direction of the rotor based on a main sensing signal and a sub sensing signal, and outputs the generated detection signal. According to the embodiment, a concept of effective edge and ineffective edge is implemented regarding changes in the main sensing signal. When the rotation direction of the rotor is one of the normal and reverse directions, a change in the main sensing signal caused by a front edge of the convex portion is defined as a signal-change caused by an effective edge in the one direction and a change in the main sensing signal caused by a back edge of the convex portion is defined as a signal-change caused by an ineffective edge in the one direction. Moreover, when rotation direction of the rotor is the other of the normal and reverse directions, a change in the main sensing signal caused by the back edge of the convex portion is defined as a signal-change caused by an effective edge in the other rotation direction and a change in the main sensing signal caused by the front edge of the convex portion is defined as a signal-change caused by an ineffective edge in the other rotation direction.

In other words, according to the embodiment, regardless of the rotation direction, a change in the main sensing signal caused by one edge of the convex portion is defined as a signal-change caused by an effective edge and a change in the main sensing signal caused by the other edge of the convex portion is defined as a signal-change caused by an ineffective edge.

Furthermore, regardless of whether the rotation direction of the rotor is the normal or the reverse direction, the signal processing circuit 10 generates the detection signal including rising-edge changes and falling-edge changes such that one of either rising edge changes or falling-edge changes successively occurs corresponding to the signal-change caused by the effective edge occurring in the main sensing signal and the other of either rising-edge changes or falling-edge changes successively occurs corresponding to the signal-change caused by the ineffective edge occurring in the main sensing signal. An operation of the signal processing circuit 10 such as this is mainly performed by a logic circuit 20. A configuration and operations of the logic circuit 20 will be described in detail hereafter.

The signal processing circuit 10 according to the embodiment is configured such that the detection signal is switched such as to change between the high and low levels, and to change between the middle and low levels, depending on whether the rotor is rotating in the normal direction or the reverse direction. More specifically, the signal processing circuit 10 is configured to output a detection signal that changes between the high and low levels, when the rotor is rotating in the normal direction, and a detection signal that changes between the middle and low levels, when the rotor is rotating in the reverse direction. Because the degree of change in the detection signal differs depending on the rotation direction in this way, the rotation direction of the rotor can also be detected based on the detection signal.

To achieve the difference in the degree of change in the detection signal based on the rotation direction of the rotor, the signal processing circuit 10 includes a first transistor Tr1 and a second transistor Tr2. In the first transistor Tr1, the drain is connected to an output terminal Out via a first resistor R1, and the source is grounded. A Zener diode ZD and a capacitor C are also connected to the output terminal Out.

Figure 3:
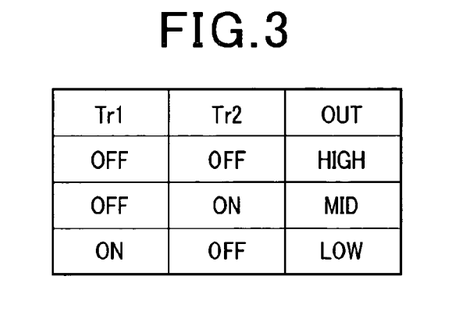
FIG. 3 is a diagram showing a relationship between ON and OFF operations of a first transistor Tr1 and a second transistor Tr2 and a level of a detection signal outputted from an output terminal Out.

Therefore, as shown in FIG. 3, when the first transistor Tr1 and the second transistor Tr2 are both OFF, the output terminal Out outputs a high voltage signal. When the first transistor Tr1 is OFF and the second transistor Tr2 is ON, the output terminal Out outputs a middle voltage signal. Moreover, when the first transistor Tr1 is ON and the second transistor Tr2 is OFF, the output terminal Out outputs a low voltage signal.

The logic circuit 20 of the signal processing circuit 10 outputs the detection signal that change by differing degrees based on the rotation direction of the rotor from the output terminal Out, as described above, by turning the first transistor Tr1 and the second transistor Tr2 ON and OFF accordingly. The detection signal showing three different voltage levels can be used by a pulse processing circuit 11 placed outside the signal processing circuit. Therefore, the pulse processing circuit 11 can detect both the rotational position and the rotation direction of the rotor by processing the detection signal. The pulse signal processing circuit corresponds to an external device.

Next, before the logic circuit 20 is described, first, the changes in the main sensing signal caused by the effect edge and by the ineffective edge will be described with reference to FIG. 4 and FIG. 5.

Figure 4:
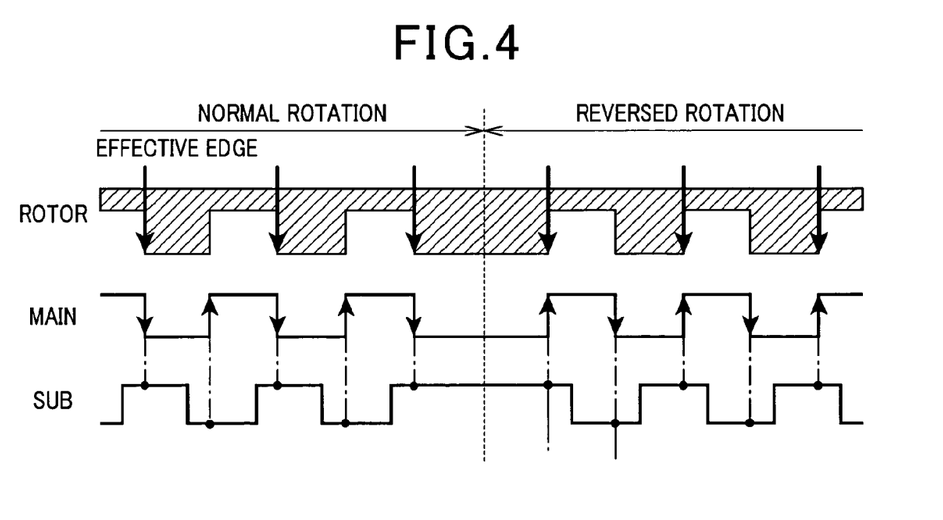
FIG. 4 is an explanatory diagram showing an effective edge and an ineffective edge, also indicating changes in a main sensing signal and a sub sensing signal caused by convex portions and concave portions of gear teeth on a rotor.

In an example shown in FIG. 4, when the rotor is rotating in the normal direction, a change in the main sensing signal caused by the front edge of the convex portion of a gear tooth in the normal direction is defined as a signal-change caused by an effective edge, and a change in the main sensing signal caused by a back edge of the convex portion is defined as a signal-change caused by an ineffective edge. In this instance, as shown in FIG. 5, a falling-edge change in the main sensing signal is the signal-change caused by the effective edge and a rising-edge change in the main sensing signal is the signal-change caused by the ineffective edge. On the other hand, when the rotor is rotating in the reverse direction, a change in the main sensing signal caused by the back edge of the convex portion of a gear tooth in the reverse direction is defined as a signal change caused by an effective edge, and a change in the main sensing signal caused by a front edge of the convex portion is defined as a signal change caused by an ineffective edge. In this case, a rising-edge change in the main sensing signal is the signal change caused by the effective edge and a falling-edge change in the main sensing signal is the signal change caused by the ineffective edge.

As described above, when the rotor is rotating in the normal direction, a change in the main sensing signal caused by the front edge of the convex portion is defined as a signal change caused by an effective edge and when the rotor is rotating in the reverse direction, a change in the main sensing signal caused by the back edge of the convex portion is defined as a signal change caused by an ineffective edge. Therefore, in the embodiment, regardless of the rotation direction of the rotor, a change in the main sensing signal caused by the same edge (one side of the edges) of the convex portion is a change caused by the effective edge.

Whether the rotor is rotating in the normal direction or in the reverse direction can be judged by a phase relationship between the main sensing signal and the sub sensing signal. In the example shown in FIG. 4, when the rotor is rotating in the normal direction, the phase of the main sensing signal is advanced relative to the phase of the sub sensing signal. Therefore, when the falling-edge change occurs in the main sensing signal, the sub sensing signal is held high. When the rising-edge change occurs in the main sensing signal, the sub sensing signal is held low. On the other hand, when the rotor is rotating in the reverse direction, the phase of the sub sensing signal is more advanced than the phase of the main sensing signal. Therefore, when the rising-edge change occurs in the main sensing signal, the sub sensing signal is held high. When the falling-edge charge occurs in the main sensing signal, the sub sensing signal is held low, in this way, whether the rotor is rotating in the normal direction or in the reverse direction can be determined by the level of the sub sensing signal when the rising-edge change or the falling-edge change occurs in the main sensing signal.

Figure 5:
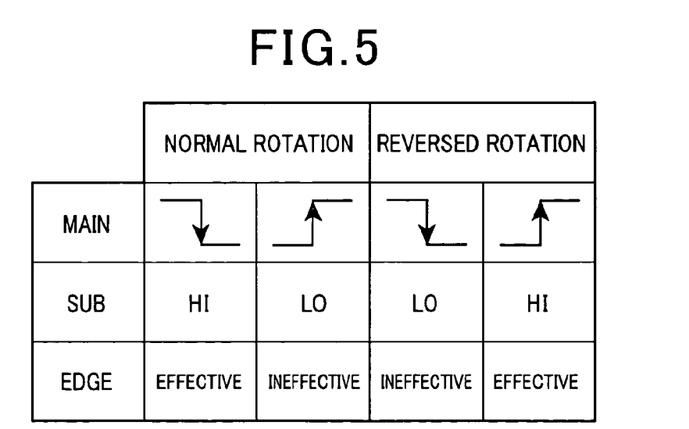
FIG. 5 is an explanatory diagram explaining the effective edge and the ineffective edge in accompaniment with FIG. 4.

An overview of the above-described relationship is shown in FIG. 5. However, regardless of the examples in FIG. 4 and FIG. 5, the relationship between the effective edge and ineffective edge can be reversed that is, the change in the main sensing signal caused by the back edge of the convex portion in the normal direction of the rotor can be defined as the signal change caused by the effective edge and the change in the main sensing signal caused by the front edge of the convex portion in the normal direction can be defined as the signal change caused by the ineffective edge.

Next, the configuration and operations of the logic circuit 20 will be described in detail with reference to A circuit diagram in FIG. 6 and waveform diagrams in FIG. 7 and FIG. 8.

Figure 6:
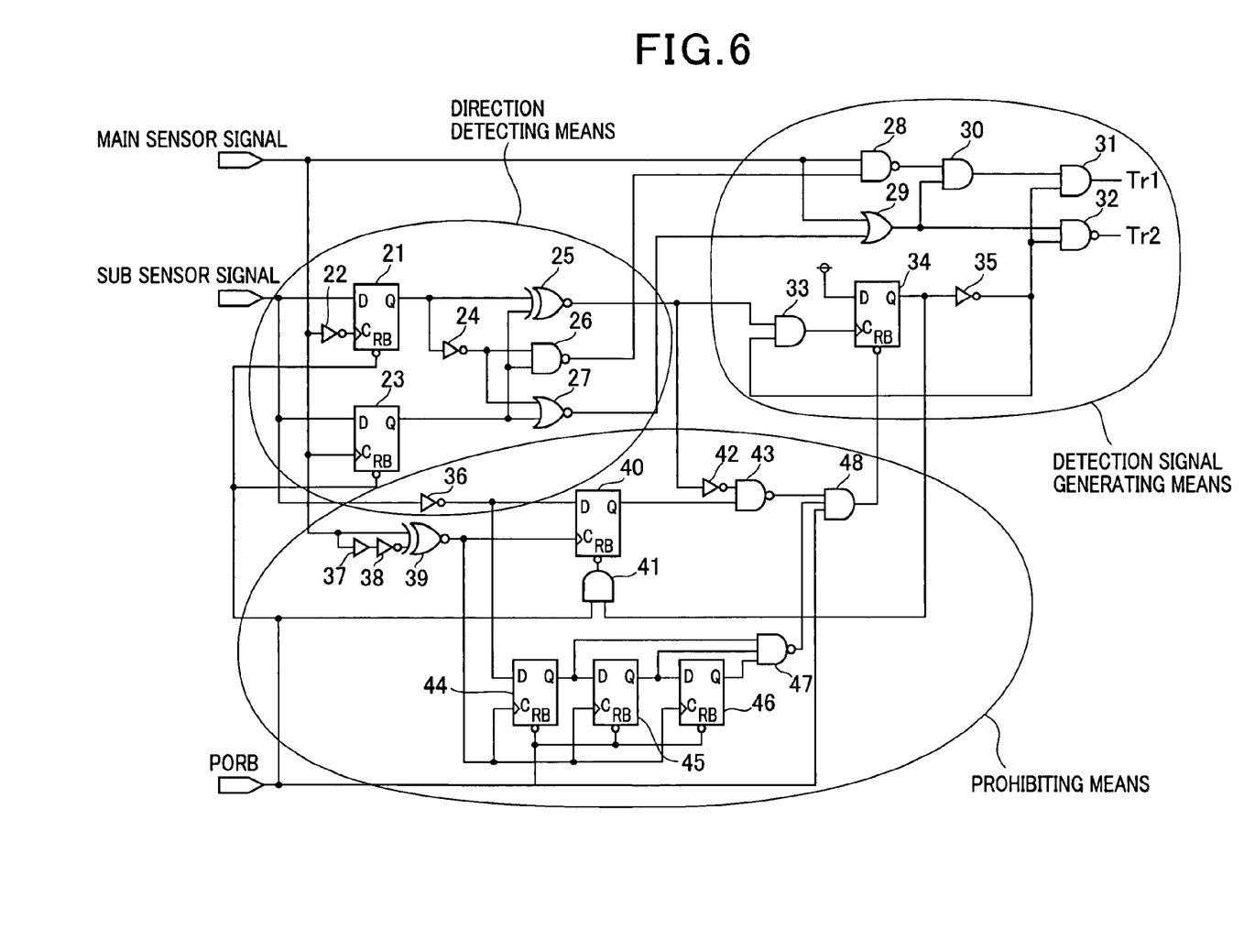
FIG. 6 is a circuit configuration diagram showing a logic circuit 20.

As shown in FIG. 6, the main sensing signal is inputted into a clock terminal of a D flip-flop 21 via an inverter 22, and into a clock terminal of a D flip-flop 23, The sub sensing signal is inputted into data input terminals of both D flip-flops 21 and 23.

The D flip-flop 21 outputs a high-level signal when the rotor is rotating in the normal direction. The D flip-flop 21 outputs a low-level signal when the rotor is rotating in the reverse direction.

In other words, the main sensing signal is inputted into the clock terminal of the D flip-flop 21 via the inverter 22. Therefore, when the main sensing signal falls, the D flip-flop 21 reads the level of the sub sensing signal provided to the data input terminal, and outputs a signal having the read level from an output terminal. As shown in FIG. 5, when the rotor is rotating in the normal direction, the sub sensing signal is held high at the timing at which the main sensing signal falls. When the rotor is rotating in the reverse direction, the sub sensing signal is held low at the timing at which the main sensing signal falls. Therefore, when the rotor is rotating in the normal direction, the D flip-flop 21 outputs a high-level signal. When the rotor is rotating in the reverse direction, the D flip-flop 21 outputs a low-level signal.

On the other hand, when the rotor is rotating in the reverse direction, the D flip-flop 23 outputs a high-level signal. When the rotor is rotating in the normal direction, the D flip-flop 23 outputs a low-level signal.

The main sensing signal is inputted directly into the clock terminal of the D f lip-flop 23. Therefore, when the main sensing signal rises the D flip-flop 23 reads the level of the sub sensing signal provided to the data input terminal, and outputs a signal having the read level from the output terminal. As shown in FIG. 5, when the rotor is rotating in the reverse direction, the sub sensing signal is held high at the timing at which the main sensing signal rises. When the rotor is rotating in the normal direction, the sub sensing signal is held low at the timing at which the main sensing signal rises. Therefore, when the rotor is rotating in the reverse direction, the D flip-flop 23 outputs a high-level signal. When the rotor is rotating in the normal direction, the D flip-flop 23 outputs a low-level signal.

The outputs from the two D flip-flops 21 and 23 are inputted into an exclusive NOR (ExNOR) circuit 25. The ExNOR circuit 25 detects a transition of a rotation direction in which the rotor changes the rotation direction from the normal direction to the reverse direction, or from the reverse direction to the normal direction. In other words, when the rotor continues rotating in the normal direction or the reverse direction, one input signal inputted into the ExNOR circuit 25 is held high and the other input signal is held low. Therefore, the output signal from the ExNOR circuit 25 is held low. However, when the rotor changes the rotation direction, the signals outputted from the two D flip-flops 21 and 23 are both held either low or high depending on the rising-edge change and the falling-edge change that subsequently occur in the main sensing signal. In this instance, the ExNOR circuit 25 outputs a high-level signal. Therefore, the transition of the rotation direction in which the rotor changes the rotation direction can be detected based on the signal outputted from the ExNOR circuit 25 being held high. Thus, circuits comprising D flip-flop 21, 23 and ExNor circuit 25 mainly function as direction detecting means.

The output from the D flip-flop 21 is inputted into an NAND circuit 26 and an NOR circuit 27 via an inverter 24. The output from the D flip-flop 23 is directly inputted into the NAND circuit 26 and the NOR circuit 27. The NAND circuit 26 detects that the rotor is rotating in the reverse direction. The NOR circuit 27 detects that the rotor is rotating in the normal direction.

The output from the D flip-flop 21 is inputted into the NAND circuit 26 via the converter 24. Therefore, an output signal from the NAND circuit 26 is only held low when the rotor is rotating in the reverse direction. In other words, the NAND circuit 26 outputs a high-level signal when the rotor is rotating in the normal direction or is changing the rotation direction. The NAND circuit 26 only outputs a low-level signal when the rotor is rotating in the reverse direction.

The output from the D flip-flop 21 is inputted into the NOR circuit 27 via the inverter 24. Therefore, an output signal from the NOR circuit 27 is only held high when the rotor is rotating in the normal direction. In other words, the NOR circuit 27 outputs a low-level signal when the rotor is rotating in the reverse direction or is changing the rotation direction. The NOR circuit 27 only outputs a high-level signal when the rotor is rotating in the normal direction.

In addition to the two D flip-flops 21 and 23, the main sensing signal is also inputted into an NAND circuit 28 and an OR circuit 29. Another input signal inputted into the NAND circuit 28 is a signal from the NAND circuit 26 that outputs a low-level signal when the rotor is rotating in the reverse direction, and outputs a high-level signal when the rotor is rotating in the normal direction or changes the rotation direction. Another input signal inputted into the OR circuit 29 is a signal from the NOR circuit 27 that outputs a high-level signal when the rotor is rotating in the normal direction, and outputs a low-level signal when the rotor is rotating in the reverse direction or changes the rotation direction.

Therefore, the NAND circuit 28 outputs an inverse signal in which the level of the main sensing signal is inverted, when the rotor is rotating in the normal direction or changes the rotation direction. The NAND circuit 28 outputs a constant high-level signal when the rotor is rotating in the reverse direction. The OR circuit 29 outputs a constant high-level signal when the rotor is rotating in the normal direction. The OR circuit 29 outputs the main sensing signal when the rotor is rotating in the reverse direction or changes the rotation direction.

The output from the NAND circuit 28 and the output from the OR circuit 29 are inputted into an AND circuit 30. Therefore, the AND circuit 30 outputs an inverse signal that is the inverted main sensing signal when the rotor is rotating in the normal direction. The AND circuit 30 outputs the main sensing signal when the rotor is rotating in the reverse direction.

Here, an AND circuit 31 drives the above-described first transistor Tr1. The output from the AND circuit 31 is connected to the gate of the first transistor Tr1. An NAND circuit 32 drives the second transistor Tr2. The output from the NAND circuit 32 is connected to the gate of the second transistor Tr2.

The output from the above-described AND circuit 30 and an output from an inverter 35 are inputted into the AND circuit 31. The inverter 35, described in detail hereafter, outputs a low-level signal when the transition of the rotation direction occurs in the rotor and the detection signal outputted from the signal processing circuit 10 is fixed at a middle level. The inverter 35 outputs a high-level signal when the rotor is rotating in the normal direction or the reverse direction. The output from the OR circuit 29 and the output from the inverter 35 are inputted into the NAND circuit 32.

The output from the inverter 35 is held high when the rotor is rotating in the normal direction. Therefore, the AND circuit 31 outputs an inverse signal that is the inverted main sensing signal. The NAND circuit 32 outputs a constant low-level signal. As a result, the second transistor Tr2 is turned OFF, and only the first transistor Tr1 is turned ON and OFF. Therefore, the detection signal outputted from the output terminal Out is a signal that changes between the high and low levels, as shown in FIG. 7.

When the AND circuit 31 outputs a high-level signal and the first transistor Tr1 is turned ON, the detection signal outputted from the output terminal Out is held low. When the AND circuit 31 output a low-level signal and the first transistor Tr1 is turned OFF, the detection signal is held high. As described above, the first transistor Tr1 is driven by the inverse signal that is the inverted main sensing signal. Therefore, when the rotor is rotating in the normal direction, the detection signal is also held high when the main sensing signal is held high. The detection signal is also held low when the main sensing signal is held low. In other words, the detection signal is a signal having the same phase as the main sensing signal.

On the other hand, when the rotor is rotating in the reverse direction, the output from the inverter 35 is held high. Therefore, the AND circuit 31 outputs the main sensing signal as is. The NAND circuit 32 outputs the inverse signal that is the inverted main sensing signal. As a result, when the first transistor Tr1 is turned ON, the second transistor Tr2 is turned OFF. When the first transistor Tr1 is turned OFF, the second transistor Tr2 is turned ON. Therefore, the detection signal outputted from the output terminal Out is a signal that changes between the middle and low levels, as shown in FIG. 7.

When the rotor is rotating in the reverse direction, the AND circuit 31 outputs the main sensing signal as is and drives the first transistor Tr1. Therefore, contrary to when the rotor is rotating in the normal direction, the detection signal is held low when the main sensing signal is held high. The detection signal is held high when the main sensing signal is held low. In other words, when the rotor is rotating in the reverse direction, the detection signal is a signal with the opposite phase to the main sensing signal.

In this way, the NAND circuit 28, the OR circuit 29, and the AND circuit 30 invert the phase of the detection signal in relation to the phase of the main sensing signal depending on whether the rotor is rotating in the normal direction or the reverse direction. As a result of the phase of the detection signal being inverted depending on whether the rotor is rotating in the normal direction or the reverse direction, as shown in FIG. 7, a detection signal can be generated in which the falling-edge change occurs based on the signal change caused by the effective edge occurring in the main sensing signal and the rising-edge change occurs based on the signal change caused by the ineffective edge, regardless of whether the rotation direction of the rotor is the normal direction or the reverse direction. Therefore, the number of effective edges of the rotor can be counted from the falling-edge change in the detection signal. As a result, regardless of the rotation direction of the rotor, the position of the same edge of a gear tooth on the rotor can be detected. The rotational position of the rotor can be detected with high accuracy. Thus, circuits necessary to generating Tr1 and Tr2 signals, for example, the NAND circuit 28, the OR circuit 29, the AND circuits 30, 31, 33, the NAND circuit 32 and the D flip-flop 34 with the converter 35 configures a detection signal generating means.

Figure 7:
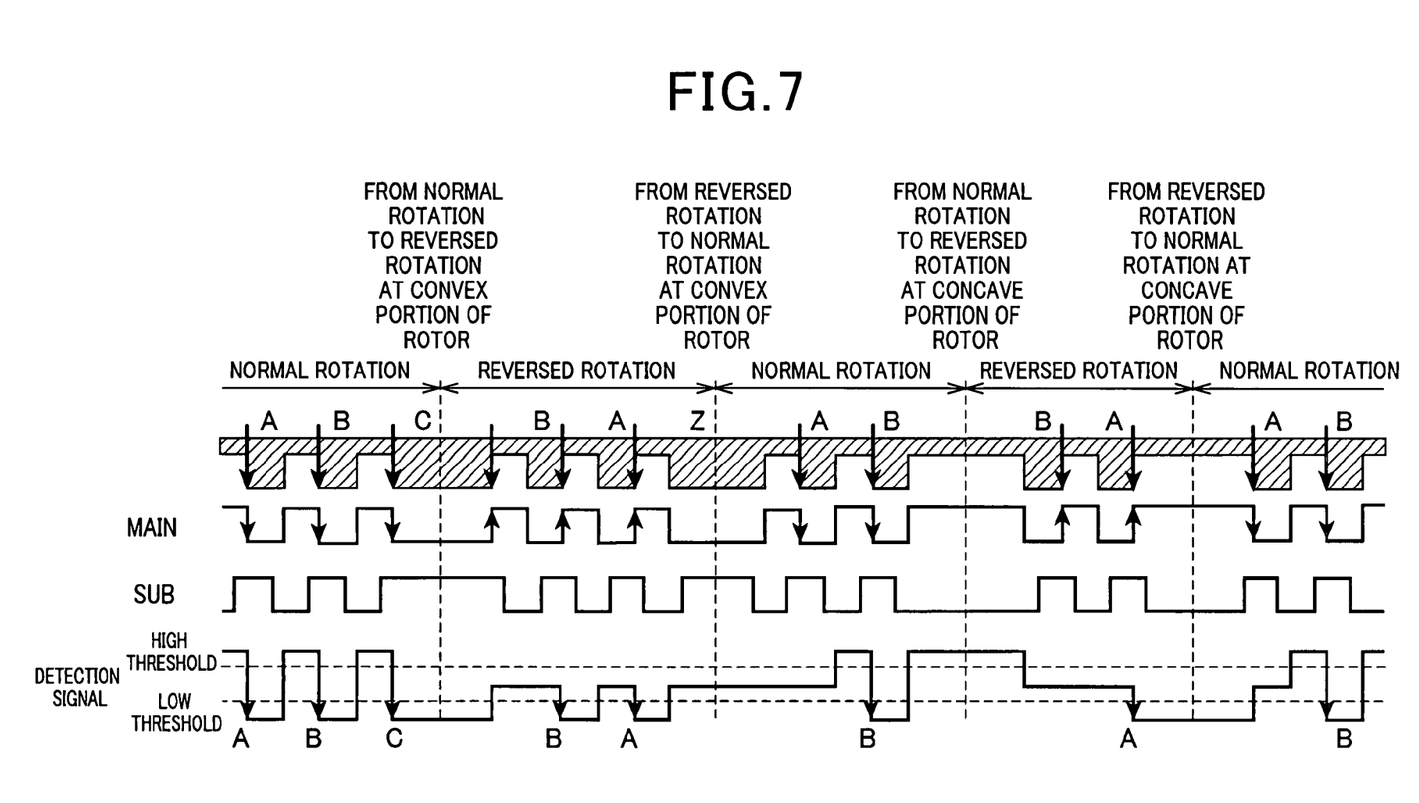
FIG. 7 is a waveform diagram explaining operations of the logic circuit 20.

When a detection signal is read and processed in a control device (not shown), whether the detection signal changes between the high and low levels, or between the middle and low levels, can be determined through use of a high threshold and a low threshold as shown in FIG. 7. As a result, whether the rotor is rotating in the normal direction or in the reverse direction can be detected based on the detection signal.

Next, a configuration will be described for preventing gear tooth detection discrepancy by the detection signal when the rotor changes the rotation direction from the normal direction to the reverse direction or from the reverse direction to the normal direction.

The output from the ExNOR circuit 25 and the output from the inverter 35, described above, are inputted into an AND circuit 33. As described above, the ExNOR circuit 25 outputs the low-level signal when the rotor is continuously rotating in the normal direction or the reverse direction, and outputs the high-level signal when the transition of the rotation direction occurs in which the rotor changes the rotation direction. Therefore, the signal outputted from the AND circuit 33 rises from low to high when the rotor changes the rotation direction.

The output from the circuit 33 is inputted into the clock terminal of a D flip-flop 34. The data input terminal of the D flip-flop 34 is connected to a power supply terminal. A high-level signal is supplied to the data input terminal at all times. Therefore, as a result of the high-level signal being read from the data input terminal at a timing at which the signal that rises from low to high is inputted into the clock terminal, the D flip-flop 34 outputs a high-level signal from the data output terminal until a low-level reset signal is inputted into the reset terminal.

When the D flip-flop 34 outputs the high-level signal from the data output terminal, the output from the inverter 35 is held low. In this way, the inverter 35 outputs a low-level signal at the timing at which the transition of the rotation direction of the rotor occurs. Then, the output from the AND circuit 31 is fixed at low. The output from the NAND circuit 32 is fixed at high. As a result, because the first transistor Tr1 is turned OFF and the second transistor Tr2 is turned ON, the detection signal is fixed at the middle level. In this way, according to the embodiment, when the transition of the rotation direction in which the rotor changes the rotation direction is detected, the detection signal is switched to the middle level. The detection signal is held at the middle level until the reset signal is inputted into the D flip-flop 34.

For example, in FIG. 7, when the rotation direction changes from the normal direction to the reverse direction at a convex portion (tooth C) of the rotor, a signal change caused by the effective edge of the tooth C that is the convex portion of the gear tooth successively occurs in the main sensing signal. Therefore, the ExNOR circuit 25 outputs a high-level signal at the timing at which the signal change caused by the effective edge successively occurs, namely at the timing at which the second effective edge is generated. Then, as indicated by a thick line in FIG. 7, the detection signal is switched from the low level to the middle level by the low-level signal outputted from the inverter 35, and is held at the middle level.

In other words, in this instance, the change in the main sensing signal when the transition of the rotation direction is detected from the level of the sub sensing signal during the successive change occurring in the main sensing signal is the signal change caused by the effective edge. In an instance such as this, even when the signal change caused by the effective edge occurs in the main sensing signal, the detection signal is switched to the middle level and held at the middle level based on the signal change caused by the effective edge occurring in the main sensing signal, without the falling-edge change occurring in the detection signal. As a result, the falling-edge change can be prohibited from occurring in the detection signal based on the change in the main sensing signal caused by the first effective edge during a change of the rotation direction of the rotor.

In FIG. 7, when the rotation direction is changed from the reverse direction to the normal direction at a convex portion (tooth Z) of the rotor, the signal change caused by the ineffective edge of the tooth Z successively occurs in the main sensing signal. Therefore, the ExNor circuit 25 outputs a high-level signal at the timing at which the signal change caused by the ineffective edge successively occurs. Then, as indicated by a thick line in FIG. 7, the detection signal is fixed at the middle level by the low-level signal outputted from the inverter 35 as a result of the operation of the D flip-flop 34. In other words, when the change in the main sensing signal due to change of the rotation direction is detected in the rotor using the change caused by the ineffective edge, the detection signal is switched to the middle level at the same time the transition of the rotation direction is detected, and the middle level is held. Then, the detection signal is merely required to be held at the middle level to prohibit the falling-edge change from occurring in the detection signal based on the subsequent change in the main sensing signal caused by the first effective edge (the effective edge of the tooth A). Therefore, circuit configuration can be simplified.

According to the embodiment, the detection signal changes between the low and middle levels when the rotor is rotating in the reverse direction. In the example shown in FIG. 7 in which the rotation direction is changed at the convex portion (tooth Z), the detection signal is at the middle level before the transition of the rotation direction in the rotor is detected. Therefore, even when the detection signal is fixed at the middle level based on the detection of the transition of the rotation direction in the rotor, no apparent changes occur in the detection signal.

The circuit configuration for generating the reset signal and inputting the generated reset signal into the D flip-flop 34, and a timing at which the reset signal is generated will be described as following.

The D flip-flop 34 is reset (becomes low-active) when the low-level reset signal is inputted into the reset terminal and outputs a low-level signal from the data output terminal. As a result, the output from the inverter 35 is switched from a low-level signal to a high-level signal. The detection signal fixed at the middle level is released.

The reset signal is outputted to the reset terminal of the D flip-flop 34 via an AND circuit 48. An output from an NAND circuit 43 is one input inputted into the AND circuit 48. The output from the ExNor circuit 25 is inputted into the NAND circuit 43 via an inverter 42. An output from a D flip-flop 40 is also inputted into the NAND circuit 43.

A sub sensing signal is inputted into the data input terminal of the D flip-flop 40 via an inverter 36. The output from an ExNor circuit 39 is inputted into the clock terminal; The main sensing signal is directly inputted into one input terminal of the ExNOR circuit 39. The main sensing signal is inputted into another input terminal via a delay circuit. The delay circuit includes a buffer 37 and an inverter 38. Therefore, the ExNOR circuit 39 outputs a pulse signal that is held high for a duration of a delay time of the delay circuit when the rising-edge change and the falling-edge charge occur in the main sensing signal. In other words, the buffer 37, the inverter 38, and the ExNOR circuit 39 detect the rising-edge change and the falling-edge change in the main sensing signal, and generate the pulse signal.

The output from the ExNOR circuit 39 is inputted into the clock terminal of the D flip-flop 40. Therefore, the D flip-flop 40 reads a signal in which the level of the sub sensing signal when the rising-edge change or the falling-edge change occurs in the main sensing signal is inverted by the inverter 36. The D flip-flop 40 outputs a signal based on the level of the read signal from the data output terminal.

As shown in FIG. 5, regardless of whether the rotor is rotating in the normal direction or the reverse direction, when the rising-edge change or the falling-edge change occurs in the main pulse signal, the sub sensing signal is held high when the change is the signal change caused by the effective edge. The sub sensing signal is held low when the change is the signal change caused by the ineffective edge. After the sub sensing signal is inverted by the inverter 36, the inverted sub sensing signal is inputted into the data input terminal of the D flip-flop 40. Therefore, when the signal change caused by the effective edge occurs in the main sensing signal, the D flip-flop 40 outputs a low-level signal. When the signal change caused by the ineffective edge occurs, the D flip-flop 40 outputs a high-level signal.

Therefore, the output from the NAND circuit 43 is held low when the output from the ExNor circuit 25 is held low, indicating that the rotor is rotating in the normal direction or the reverse direction, and the D flip-flop 40 outputs a high-level signal indicating that the signal change caused by the ineffective edge has occurred in the main sensing signal.

For example, in the example shown in FIG. 7, at a timing at which a change caused by the ineffective edge of tooth B occurs in the main sensing signal after the rotor changes the rotation direction from the normal direction to the reverse direction at the convex portion (tooth C), the output from the ExNor circuit 25 is held low, indicating that the rotor is rotating in the reverse direction. The D flip-flop 40 outputs a high-level signal. Therefore, because the NAND circuit 43 outputs a low-level signal, the low-level reset signal is inputted into the reset terminal of the D flip-flop 34 via the AND circuit 48. As a result, because the D flip-flop 40 outputs a low-level signal, the output from the inverter 35 is held high. As a result, as indicated by a thick line in FIG. 7, the detection signal fixed at the middle level is released at the timing at which the signal change caused by the ineffective edge of the tooth B occurs in the main sensing signal.

When the output from the D flip-flop 34 is held low, the output is inputted into the reset terminal of the D flip-flop 40 via an AND circuit 41. Therefore, the output from the D flip-flop 40 is also held low. As a result, the output of the reset signal via the NAND circuit 43 and the AND circuit 48 is completed.

In this way, the detection signal fixed at the middle level is released as a result of the signal change caused by the ineffective edge of the tooth B occurring in the main sensing signal. Therefore, when the rotor subsequently continues rotating in the reverse direction and a signal change caused by the effective edge of the tooth B occurs in the main sensing signal, a falling-edge change can occur in the detection signal as a result of the signal change caused by the effective edge.

At this time, as shown in FIG. 7, the falling-edge changes in the detection signal occurring when the rotor is rotating in the normal direction each correspond to the front edge in the rotation direction (i.e., normal direction) of each convex portion of the gear teeth. The detection signal immediately before the rotation direction changes is in a state in which the tooth C is detected. The falling-edge change in the detection signal occurring as a result of the change in the main sensing signal caused by the first effective edge is prohibited when the rotation direction of the rotor changes. As a result, as shown in FIG. 7, the falling-edge change can occur in the detection signal as a result of the effective edge of the tooth B corresponding to the back edge in the rotation direction (i.e., reverse direction), even when the rotor rotates in the reverse direction. As a result, gear tooth detection discrepancies can be prevented from occurring with the changes in the rotation direction of the rotor.

In FIG. 7, when the rotor changes the rotation direction from the reverse direction to the normal direction at the convex portion (tooth Z), the change in the main sensing signal caused by the effective edge of the tooth A occurs earlier than the change in the main sensing signal caused by the ineffective edge of the tooth A. Therefore, when the change in the main sensing signal caused by the effective edge of the tooth A occurs, the detection signal fixed to the middle level as a result of the operation of the D flip-flop 34 is not yet released. Therefore, the detection signal does not change from the middle level as a result of the change in the main sensing signal caused by the effective edge of the tooth A. In this way, the falling-edge change in the detection signal is prevented from occurring as a result of the change in the main sensing signal caused by the first effective edge occurring after the rotation direction of the rotor changes.

Then, at the timing at which the change in the main sensing signal caused by the ineffective edge of the tooth A occurs, the output from the ExNOR circuit 25 is held low, indicating that the rotor is rotating in the normal direction. The D flip-flop 40 outputs a high-level signal. Therefore, because the NAND circuit 43 outputs a low-level signal, the low-level reset signal is inputted into the reset terminal of the D flip-flop 34 via the AND circuit 48. As a result, because the output from the inverter 35 is held high, as indicated by a thick line in FIG. 7, the detection signal fixed at the middle level is released at the timing at which the signal change caused by the ineffective edge of the tooth A occurs in the main sensing signal. The rising-edge change occurs in the detection signal as a result of the signal change caused by the ineffective edge.

As a result, when the rotor subsequently continues rotating in the normal direction and the signal change caused by the effective edge of the tooth B occurs in the main sensing signal, the falling-edge change can occur in the detection signal as a result of the signal change caused by the effective edge. Therefore, as shown in FIG. 7, gear tooth detection discrepancies occurring with the changes in the rotation direction of the rotor can be prevented.

FIG. 7 also shows instances in which the rotor changes the rotation direction at the concave portions of the gear teeth rather than the convex portions. However, changes in the detection signal including the detection signal being fixed to the middle level are similar to those occurring when the rotation direction is changed at the convex portions. Therefore, explanations thereof are omitted.

An output from an NAND circuit 47 is also inputted into the AND circuit 48 that outputs the reset signal. Respective outputs from three serially-connected D flip-flops 44, 45, and 46 are inputted into the NAND circuit 47. The output from the ExNOR circuit 39 is inputted into each clock terminal of the three serially-connected D flip-flops 44, 45, and 46. The ExNOR circuit 29 detects the rising-edge change and the falling-edge change in the main sensing signal and generates the pulse signal. The sub sensing signal is inputted into the data input terminal of the first D flip-flop 44 via the inverter 36. The output from the data output terminal of the first D flip-flop 44 is inputted into the data input terminal of the second D flip-flop 45. The output from the data output terminal of the second D flip-flop 45 is inputted into the data input terminal of the third D flip-flop 46.

Therefore, all outputs from the three D flip-flops 44, 45, and 46 inputted into the NAND circuit 47 are held high only when the signal change caused by the effective edge does not occur and the signal change caused by the ineffective edge occurs three consecutive times in the main sensing signal. Therefore, the NAND circuit 47 outputs a low-level signal when the signal change caused by the ineffective edge occurs three consecutive times in the main sensing signal. The low-level signal outputted from the NAND circuit 47 resets the D flip-flop 34 via the AND circuit 48, and releases the detection signal that is fixed at the middle level.

A reason for which the detection signal fixed at the middle level is released under the above-described conditions will be described with reference to FIG. 8. FIG. 8 shows changes in the main sensing signal, the sub sensing signal, and the detection signal when the rotor repeatedly reverses the rotation direction near a range of a single gear tooth.

Figure 8:
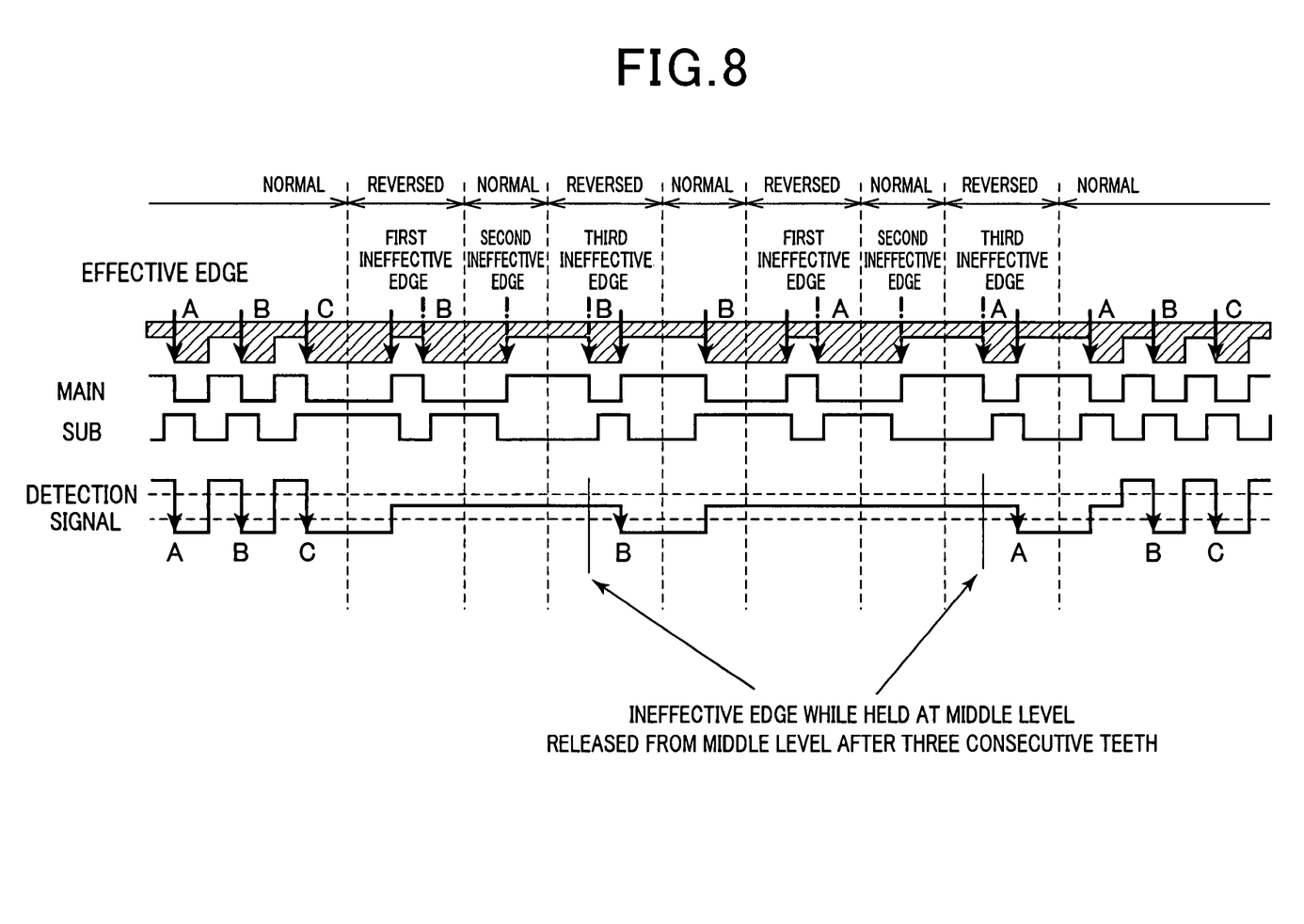
FIG. 8 is a waveform diagram explaining another operation of the logic circuit 20.

As shown in FIG. 8, when the rotor rotating in the normal direction reverses the rotation direction at the convex portion of the tooth C and repeatedly changes the rotation direction near the range of the tooth B, the change in the main sensing signal caused by the ineffective edge of the tooth B may occur three consecutive times.

In an instance such as this, the changes in the rotation direction are detected based on the change caused by the effective edge of the tooth C successively occurring in the main sensing signal. Therefore, as indicated by a thick line in FIG. 8, the detection signal is switched to the middle level and held. The detection signal fixed at the middle level is subsequently released as a result of the signal change in the main sensing signal caused by the first ineffective edge of the tooth B.

However, the change in the main sensing signal caused by the ineffective edge of the tooth B successively occurs as a result of the rotor subsequently changing the rotation direction near the tooth B. In an instance such as this, the change in the rotation direction of the rotor from the reverse direction to the normal direction is detected based on the changes in the main sensing signal caused by the first ineffective edge and the second ineffective edge. Therefore, the detection signal is fixed at the middle level based on the change in the main sensing signal caused by the second ineffective edge. The change in the rotation direction of the rotor from the normal direction to the reverse direction is further detected based on the changes in the main sensing signal caused by the second and third ineffective edges. Therefore, ordinarily, the detection signal is fixed at the middle level based on the change in the main sensing signal caused by the third ineffective edge.

However, when the detection signal is fixed at the middle level based on the change in the main sensing signal caused by the third ineffective edge in this way, as shown in FIG. 8, when the change in the main sensing signal caused by the effective edge of the tooth B occurs, and the falling-edge change is actually required to occur in the detection signal as a result of the change in the main sensing signal, this change in the detection signal is prohibited.

Therefore, according to the embodiment, a configuration is used in which the detection signal fixed at the middle level is released when the signal change caused by the ineffective edge occurs three consecutive times in the main sensing signal, through use of the series circuit of three D flip-flops 44, 45, and 46, as described above. As a result, as shown in FIG. 8, the falling-edge change can occur in the detection signal based on the change in the main sensing signal caused by the effective edge of the tooth B. Gear tooth detection discrepancies can be prevented. Thus, circuits necessary to provide a prohibiting means comprise the D flip-flops 44 to 46 with the NAND circuits 47, the AND circuit 48 and the buffer 37, the inverter 38, the Nor circuit 35, the D Flip-flop 40 with NAND circuit 41, the NAND circuit 43 with the inverter 42.

In FIG. 6, PORB indicates a power-ON reset signal. The power-ON reset signal is a reset signal that is inputted when the power of the rotation detecting device is turned ON. The reset signal is inputted into the reset terminals of all D flip-flops 21, 23, 34, 40, and 44 to 46.

The preferred embodiment of the present invention is described above. However, the present invention is not limited in any way to the above-described embodiment. Various modifications can be made without departing from the scope of the present invention.

For examples according to the above-described embodiment, the detection signal changes between the high and low levels when the rotor is rotating in the normal direction. The detection signal changes between the middle and low levels when the rotor is rotating in the reverse direction. However, the detection signal can chance between the high and low levels when the rotor is rotating in the reverse direction, and change between the middle and low levels when the rotor is rotating in the normal direction. Accordingly, a configuration may be made such that the detection signal can change between the high and low levels when the rotor is rotating in one direction, and change between the middle and low levels when the rotor is rotating in the other direction.

Moreover, according to the above-described embodiment, the falling-edge change occurs in the detection signal when the change caused by the effective edge occurs in the main sensing signal. The rising-edge change occurs in the detection signal when the change caused by the ineffective edge occurs in the main sensing signal. However, the rising-edge change can occur in the detection signal when the change caused by the effective edge occurs in the main sensing signal, and the falling-edge change can occur in the detection signal when the change caused by the effective edge occurs in the main sensing signal. However, to differentiate between the detection signal being switched to the middle level and the change occurring in the detection signal as a result of the signal change caused by the effective edge, when the rising-edge change occurs in the detection signal when the change caused by the effective edge occurs in the main sensing signal, the detection signal preferably switches between changing between the high and low levels and changing between the high and middle levels, depending on the rotation direction of the rotor.

What is claimed is:

1. A signal processing circuit for a rotation detecting device, wherein the signal processing circuit outputs a detection signal indicating both a rotation position and a rotation direction of a rotary member provided with gear teeth including plural convex portions and plural concave portions, a plurality of magnetic sensors being opposed to the rotary member and formed to output first and second sensing signals which are rectangular-waveformed and differ in phase from each other in response to movement of the rotary member, the rotary member being allowed to selectively rotate in a normal direction thereof and a reverser direction thereof, each of the convex portions having a front edge and a back edge which come first and precede later in either the normal direction or the reverse direction, the signal processing circuit comprising:

a direction detecting means for detecting a transition of the rotation direction in which the rotation direction of the rotary member changes from the normal direction to the reverse direction or from the reverse direction to the normal direction based on a phase relationship between the first and second sensing signals;

a detection signal generating means, which operates under conditions that, i) when the rotation direction of the rotary member is one of the normal and reverse directions, a change in the first sensing signal caused by the front edge of the convex portion is defined as a signal change caused by an effective edge in the one direction and a change in the first sensing signal caused by the back edge of the convex portion is defined as a signal change caused by an ineffective edge in the one direction, and ii) when rotation direction of the rotary member is the other of the normal and reverse directions, a change in the first sensing signal caused by the back edge of the convex portion is defined as a signal change caused by an effective edge in the other rotation direction and a change in the first sensing signal caused by the front edge of the convex portion is defined as a signal change caused by an ineffective edge in the other rotation direction, for generating the detection signal regardless of whether the rotation direction of the rotary member is the normal or the reverse direction, the detection signal including rising-edge change and falling-edge change thereon, the detection signal being provided such that one of either rising-edge changes or falling-edge changes successively occurs corresponding to the signal change caused by the effective edge occurring in the first sensing signal and the other of either the rising-edge changes or the falling-edge changes successively occurs corresponding to the signal change caused by the ineffective edge occurring in the first sensing signal, the detection signal being used to count the number of effective edges to obtain the rotational position and the rotational direction of the rotary member; and a prohibiting means for prohibiting the same edge change that is one of either the rising-edge change or the falling-edge change from successive occurring in the detection signal in response to a signal change in the first sensing signal caused by a first effective edge when the direction detecting means detects the rotation direction transition of the rotary member.

2. The signal processing circuit according to claim 1, wherein the detection signal generating means includes changing means for changing the detection signal among its three levels which consist of a high level, a middle level and a low level of which changes show that the rotation direction is in the normal direction or the reverse direction, so that the rotation direction of the rotary member is detected by an external device placed outside the signal processing circuit, by using the detection signal.

3. The signal processing circuit according to claim 2, wherein the prohibiting means prohibits the same change that is one of either the rising-edge change or the falling-edge change from occurring in the detection signal by keeping the detection signal fixed at the middle level, even when the signal change caused by the first effective edge occurs in the first sensing signal when the rotation direction transition of the rotary member occurs.

4. The signal processing circuit according to claim 3, wherein:

the direction detecting means includes means for identifying the rotation direction of the rotary member from a level of the second sensing signal when the first sensing signal changes, and detecting the transition of the rotation direction when the identified rotation direction changes, and in cases where the change in the first sensing signal is the signal change caused by the effective edge when the rotation direction transition is detected, the changing means is configured to switch the detection signal to the middle level and hold the detection signal at the middle level based on the change in the first sensing signal caused by the effective edge, thereby prohibiting the same change that is one of either the rising-edge change or the falling-edge change from occurring in the detection signal.

5. The signal processing circuit claim 3, wherein:

the direction detecting means includes means for identifying the rotation direction of the rotary member from a level of the second sensing signal when the first sensing signal changes, and detecting the transition of the rotation direction when the identified rotation direction changes, and in cases where the change in the first sensing signal is the signal change caused by the ineffective edge when the transition of the rotation direction is detected, the changing means is configured to switch the middle level and hold the detection signal at the middle level based on the change in the first sensing signal caused by the ineffective edge, in the holding state of which the detection signal remains fixed at the middle level even when a signal change caused by a first effective edge subsequently occurs in the first sensing signal, thereby prohibiting the same change that is one of either the rising-edge change or the falling-edge change from occurring in the detection signal.

6. The signal processing circuit according to claim 3, wherein, when the rotary member continues rotating in the same direction after the change in the detection signal based on the signal change caused by the first effective edge when the rotation direction transition of the rotary member occurs is prohibited by the detection signal remaining fixed at the middle level, the prohibiting means is configured to release the detection signal fixed at the middle level, in response to the signal change caused by the ineffective edge occurring in the first sensing signal.

7. The signal processing circuit according to claim 4, wherein, when the rotary member continues rotating in the same direction after the change in the detection signal based on the signal change caused by the first effective edge when the rotation direction transition of the rotary member occurs is prohibited by the detection signal remaining fixed at the middle level, the prohibiting means is configured to release the detection signal fixed at the middle level, in response to the signal change caused by the ineffective edge occurring in the first sensing signal.

8. The signal processing circuit according to claim 5, wherein, when the rotary member continues rotating in the same direction after the change in the detection signal based on the signal change caused by the first effective edge when the rotation direction transition of the rotary member occurs is prohibited by the detection signal remaining fixed at the middle level, the prohibiting means is configured to release the detection signal fixed at the middle level, in response to the signal change caused by the ineffective edge occurring in the first sensing signal.

9. The signal processing circuit according to claim 3, wherein, after the rotation direction transition of the rotary member is detected and the detection signal is switched to the middle level, when the signal change caused by the effective edge does not occur and the signal change caused by the ineffective edge occurs three consecutive times in the first sensing signal, the prohibiting means releases the detection signal fixed to the middle level and allows the same change that is one of either the rising-edge charge or the falling-edge change to occur in the detection signal based on a signal change caused by a subsequent effective edge.

10. The signal processing circuit according to claim 4, wherein, after the rotation direction transition of the rotary member is detected and the detection signal is switched to the middle level, when the signal change caused by the effective edge does not occur and the signal change caused by the ineffective edge occurs three consecutive times in the first sensing signal, the prohibiting means releases the detection signal fixed to the middle level and allows the same change that is one of either the rising-edge change or the falling-edge change to occur in the detection signal based on a signal change caused by a subsequent effective edge.

11. The signal processing circuit according to claim 5, wherein, after the rotation direction transition of the rotary member is detected and the detection signal is switched to the middle level, when the signal change caused by the effective edge does not occur and the signal change caused by the ineffective edge occurs three consecutive times in the first sensing signal, the prohibiting means releases the detection signal fixed to the middle level and allows the same change that is one of either the rising-edge change or the falling-edge change to occur in the detection signal based on a signal change caused by a subsequent effective edge.

12. The signal processing circuit according to claim 6, wherein, after the rotation direction transition of the rotary member is detected and the detection signal is switched to the middle level, when the signal change caused by the effective edge does not occur and the signal change caused by the ineffective edge occurs three consecutive times in the first sensing signal, the prohibiting means releases the detection signal fixed to the middle level and allows the same change that is one of either the rising-edge change or the falling-edge change to occur in the detection signal based on a signal change caused by a subsequent effective edge.

13. A rotation detecting device for detecting both a rotational position and a rotational direction of a rotary member provided with gear teeth including convex portions and concave portions, the rotary member being allowed to selectively rotate in a normal direction thereof and a reverse direction thereof, comprising:

a plurality of magnetic sensors disposed to be opposed to the rotary member and to be a predetermined distance apart from one another, detecting a change in a magnetic field in response to movement of the convex portions and the concave portions of the gear teeth moving alternately, and converting the change in the magnetic field into electrical signals that have mutually different phases;

a signal conditioning circuit for conditioning the electrical signals into rectangular waveforms as a first and a second sensing signals; and a signal processing circuit for processing the first and second sensing signals received from the signal conditioning circuit so as to generate a detection signal indicating both the rotational position and the rotational direction of the rotary member, wherein the signal processing circuit comprises:

a direction detecting means for detecting a transition of a rotation direction in which the rotation direction of the rotary member changes from the normal direction to the reverse direction or from the reverse direction to the normal direction based on a phase relationship between the first and second sensing signals;

a detection signal generating means, which operates under conditions that, i) when the rotation direction of the rotary member is one of the normal and reverse directions, a change in the first sensing signal caused by the front edge of the convex portion is defined as a signal change caused by an effective edge in the one direction and a change in the first sensing signal caused by the back edge of the convex portion is defined as a signal change caused by an ineffective edge in the one direction, and ii) when rotation direction of the rotary member is the other of the normal and reverse directions, a change in the first sensing signal caused by the back edge of the convex portion is defined as a signal change caused by an effective edge in the other rotation direction and a change in the first sensing signal caused by the front edge of the convex portion is defined as a signal change caused by an ineffective edge in the other rotation directions for generating the detection signal regardless of whether the rotation direction of the rotary member is the normal or the reverse direction, the detection signal including rising-edge change and falling-edge change thereon, the detection signal being provided such that one of either rising-edge changes or falling-edge changes successively occurs corresponding to the signal change caused by the effective edge occurring in the first sensing signal and the other of either the rising-edge changes or the falling-edge changes successively occurs corresponding to the signal change caused by the ineffective edge occurring in the first sensing signal, the detection signal being used to count the number of effective edges to obtain the rotational position and the rotational direction of the rotary member; and a prohibiting means for prohibiting the same edge change that is one of either the rising-edge change or the falling-edge change from successive occurring in the detection signal in response to a signal change in the first sensing signal caused by a first effective edge when the direction detecting means detects the rotation direction transition of the rotary member.

14. The signal processing circuit according to claim 13, wherein, the detection signal generating means includes changing means for changing the detection signal among its three levels which consist of a high level, a middle level and a low level of which changes show that the rotation direction is in the normal direction or the reverse direction, so that the rotation direction of the rotary member is detected by an external device, placed outside the signal processing circuit, by using the detection signal.

15. The rotation detecting device according to claim 14, wherein, the prohibiting means prohibits the same change that is one of either the rising-edge change or the falling-edge change from occurring in the detection signal by keeping the detection signal fixed at the middle level, even when the signal change caused by the first effective edge occurs in the first sensing signal when the rotation direction transition of the rotary member occurs.

* * * * *